Aug. 25, 1942. A. A. KUCHER 2,294,037
METHOD OF MAKING A MOTOR-COMPRESSOR UNIT FOR REFRIGERATION
Original Filed April 30, 1937 4 Sheets-Sheet 1
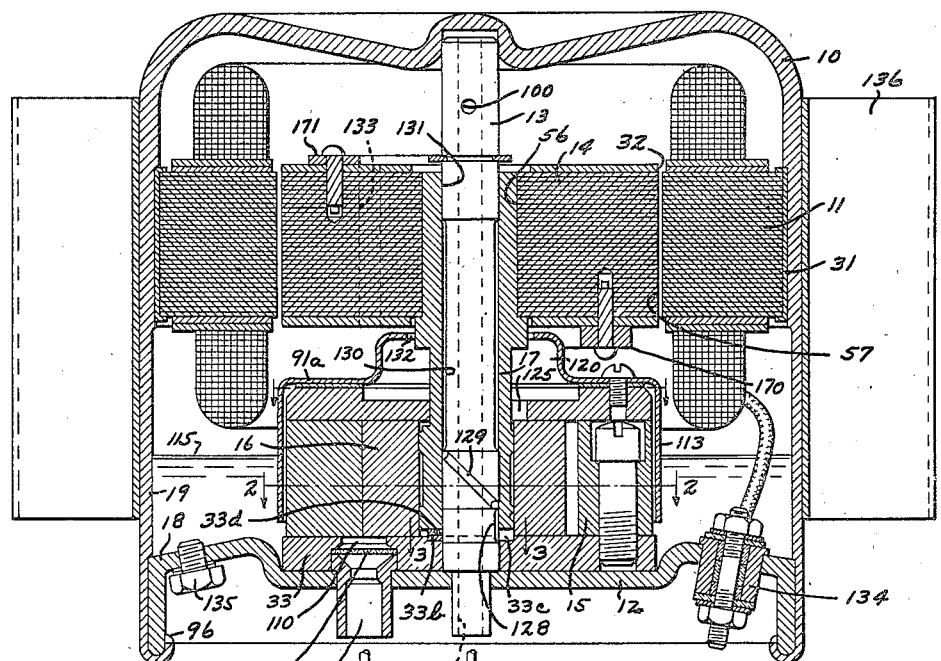
Fig. 1
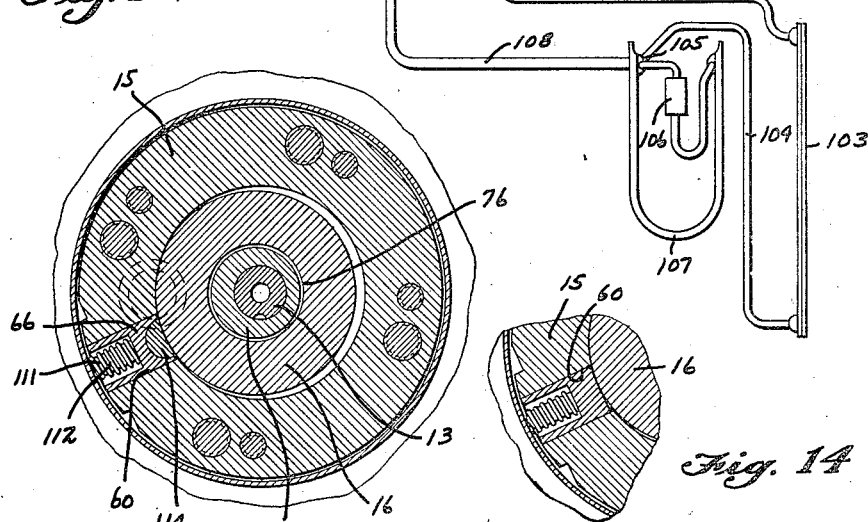
Fig. 2
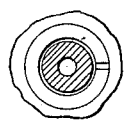
Fig. 3
Fig. 14
INVENTOR.
Andrew A. Kucher
BY Spencer, Hardman & Fehr
ATTORNEYS.

Aug. 25, 1942.  A. A. KUCHER  2,294,037
METHOD OF MAKING A MOTOR-COMPRESSOR UNIT FOR REFRIGERATION
Original Filed April 30, 1937   4 Sheets-Sheet 2
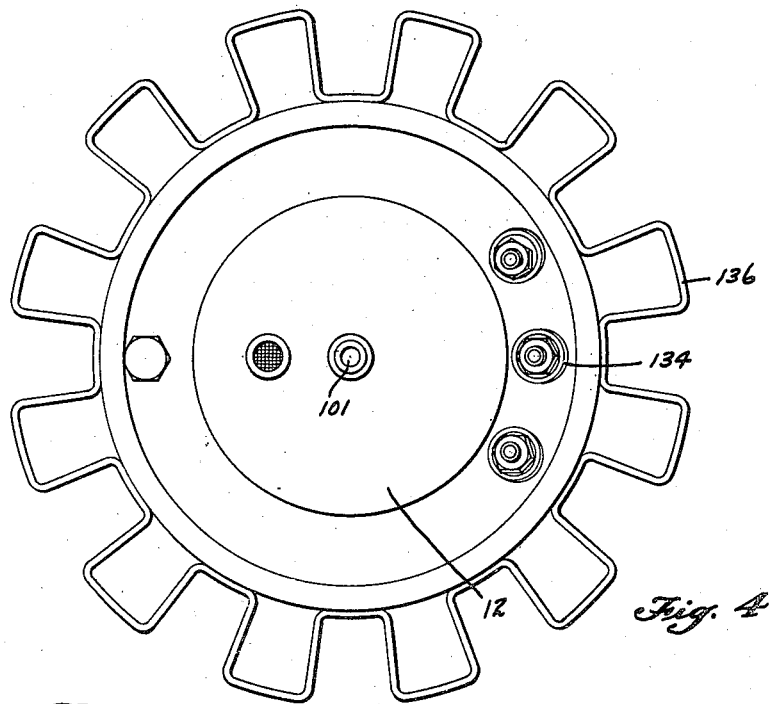
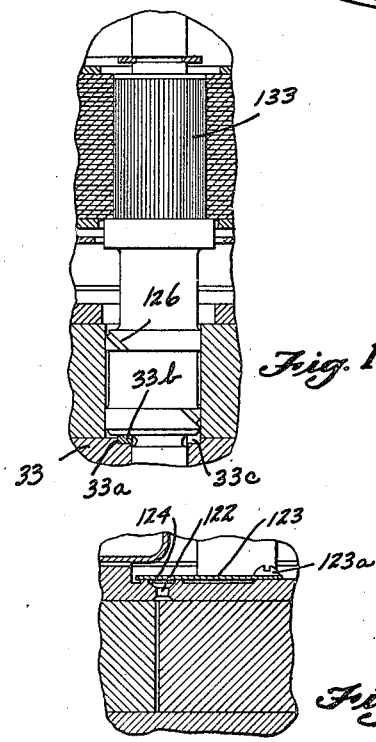
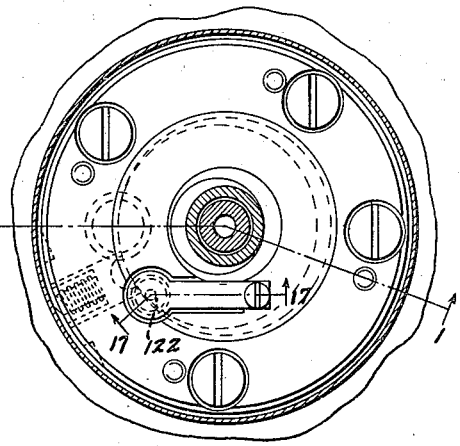
INVENTOR.
Andrew A. Kucher
BY Spencer, Hardman & Fehr
ATTORNEYS.

Aug. 25, 1942. A. A. KUCHER 2,294,037

METHOD OF MAKING A MOTOR-COMPRESSOR UNIT FOR REFRIGERATION

Original Filed April 30, 1937 4 Sheets-Sheet 4

INVENTOR.
Andrew A. Kucher
BY Spencer, Hardman & Fehr
ATTORNEYS.

Patented Aug. 25, 1942

2,294,037

UNITED STATES PATENT OFFICE 2,294,037

METHOD OF MAKING MOTOR-COMPRESSOR UNITS FOR REFRIGERATION

Andrew A. Kucher, Dayton, Ohio, assignor to General Motors Corporation, Dayton, Ohio, a corporation of Delaware Original application April 30, 1937, Serial No. 139,989. Divided and this application June 28, 1939, Serial No. 281,668

2 Claims. (Cl. 29—156.4)

This invention relates to refrigeration and more particularly to a motor-compressor unit for use in refrigerating systems and the manufacture thereof.

This application is a division of my copending application Serial No. 139,989 filed April 30, 1937, Patent No. 2,243,464, which is a division of Patent No. 2,130,349.

It is among the objects of this invention to provide a motor-compressor unit which may be made very accurately, and is capable of operating at high efficiencies notwithstanding the fact that the parts are easily made for quantity production and may be assembled without troublesome selectivity.

Further objects and advantages of the present invention will be apparent from the following description, reference being had to the accompanying drawings, wherein a preferred form of the present invention is clearly shown.

In the drawings:

Fig. 1 is a view, partly in vertical cross-section and partly diagrammatic of a refrigerating system including the motor-compressor unit;

Fig. 2 is a horizontal cross-sectional view taken along the line 2—2 of Fig. 1;

Fig. 3 is a vertical cross-sectional view taken along the line 3—3 of Fig. 1;

Fig. 4 is a bottom view of the unit shown in Fig. 1;

Figure 5:
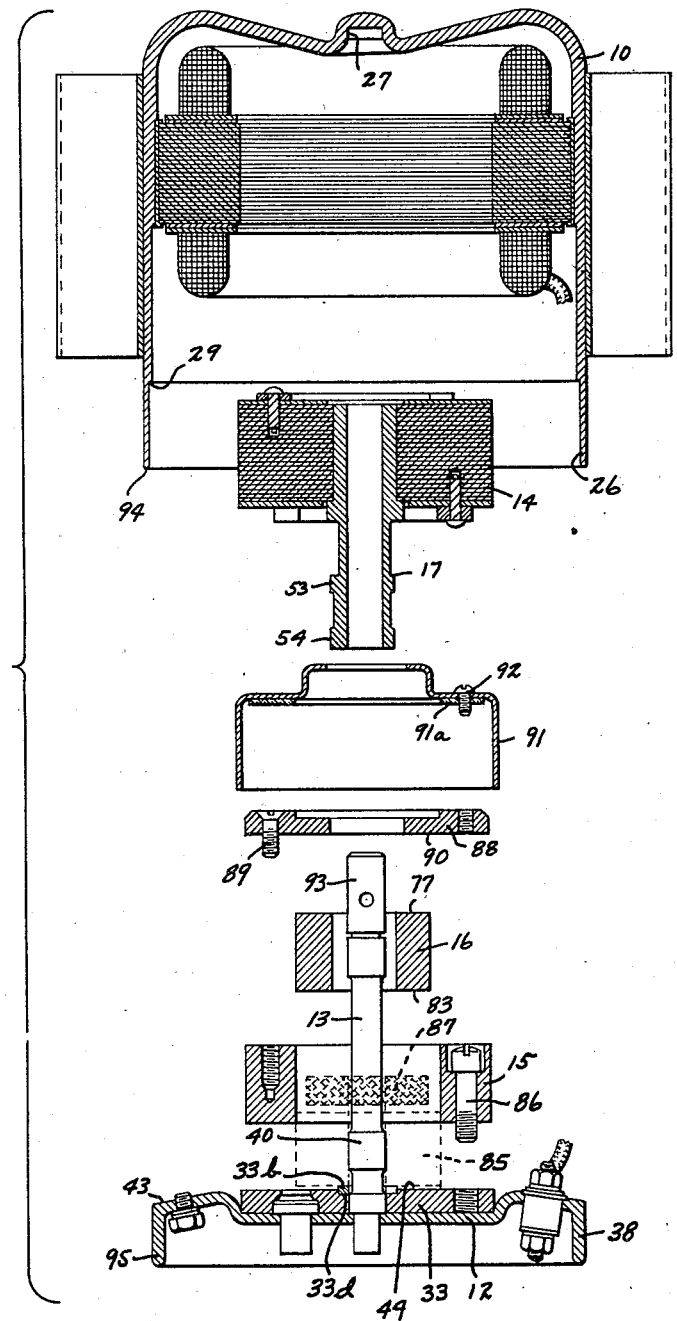
Fig. 5 is an "exploded" view of the unit, particularly useful in showing the various steps of assembly of the unit.

Figs. 6 to 13 inclusive illustrate the various steps which may be performed by standard machine tools in the manufacture of the compressor unit;

Fig. 14 is a cross-sectional view of a portion of the mechanism shown in Fig. 2 with a slightly modified form of divider;

Fig. 15 is a cross-sectional view somewhat similar to Fig. 1, but with the drive shaft shown in elevation;

Fig. 16 is a cross-sectional view looking down on the top of the compressor. This figure indicates by the line 1—1 the cross-section along which Fig. 1 is taken; and Fig. 17 is a cross-sectional view taken along the line 17—17 of Fig. 16.

According to this invention it is possible to produce a motor-compressor unit in which substantially all of the parts can be accurately and cheaply made and which the assembly may be performed speedily and without the necessity of careful fitting, lapping or the like. Notwithstanding this ease of manufacture, a unit made in accordance with this invention is of extremely high efficiency and is capable of operating at exceptionally low current consumption and high refrigerating efficiency.

While this unit is particularly adapted to manufacture by the use of the simplest of machine-shop tooling operations, it is to be understood that many of the features and advantages of this invention may be utilized where a more specialized tool equipment is desired either by preference or because of prior acquisition.

In the manufacture of this motor-compressor unit, advantage is taken of the extreme accuracy of certain types of standard or special tools, when they are limited to producing cylindrical surfaces about a common axis or of a predetermined eccentricity and also when they are limited to producing plane surfaces at right angles to the axes of the cylindrical surfaces. The moving parts of the unit, which must maintain close tolerances in order to operate freely and to maintain fluid seals during the compressing operation, may be finished by standard grinding tools which produce accurately cylindrical surfaces about any desired axis and plane surfaces at right angles to such axis.

The motor-compressor unit is manufactured preferably by forming a cup member with certain parts of the unit assembled therein and by forming a sealing member with other parts of the unit assembled thereon and thereafter assembling these two members by telescoping cylindrical surfaces with each other and by abutting plane surfaces with each other. The entire assembly is guided by a stationary shaft which is rigid with respect to one of the members and slides into a slot or cylindrical receiving surface in the other member, the working parts of the unit thus being brought together easily with the least likelihood of distortion or binding and with extreme accuracy.

The cup member, above referred to, preferably has the motor stator assembled therein. The sealing member has the motor rotor, the working parts of the compressor assembled thereon, and the rigid stationary shaft secured thereto for guiding the final assembling operation.

In the particular embodiment disclosed, the cup member is shown at 10, with the motor stator 11 therein. The sealing member is shown at 12 and carries a stationary shaft 13, a motor rotor 14 and a compressor shown below the rotor 14, the compressor including a stationary pumping cylinder 15 and a rotary piston 16. The motor and the compressor are drivingly connected by means of a drive shaft, sleeve or eccentric 17, these parts being all produced with cylindrical cooperating surfaces in a manner more fully to be described.

Figure 6:
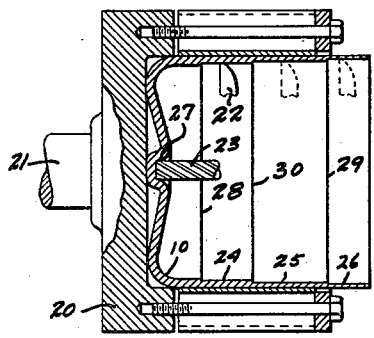

Some of the preferred steps in the production of the cup member are shown at Fig. 6. The shell of the member 10 is first roughly produced by a drawing operation from deep drawing steel. This operation is well-known and need not be specifically illustrated. This drawing operation produces the general outline of the shell 10, with a substantial thickness of material throughout the shell. The shell thus roughly formed is placed in a fixture 20 held on the rotating spindle 21 of a standard grinding machine, and several cylindrical surfaces, preferably internal, are produced therein by an internal grinding machine or a lathe, whose rotary grinding member or cutting tool is diagrammatically shown at 22, and by a reaming device 23. One or more plane surfaces also are produced by face grinding, while the cup member 10 is held in the fixture, to insure that all cylindrical surfaces are truly coaxial to the common axis of the member 10 and that the plane surfaces are at a true right angle to the said common axis. Thus the internal cylindrical surface 24 is produced for the reception of the stator 11. The internal cylindrical surface 25 is produced, so that the stator may be inserted in the member 10 without undue resistance. An internal cylindrical surface 26 is produced for the reception of the sealing member 12 in a manner hereafter to be more fully described. Also an internal cylindrical shaft receiving surface 27 is produced, preferably by the reaming device 23. These surfaces 24 to 26 inclusive are truly coaxial because cup member 10 is maintained in the fixture 20 and rotates with the spindle 21. In addition, one or more plane surfaces are produced on the member 10. Thus the plane surface 28 is produced as a stop for the stator 11, the plane abutting surface 29 is produced for receiving the corresponding abutting surface on the sealing member 12 hereafter to be described. The surface 30 need not be a true plane surface, but conveniently can remain as formed by the internal grinding tubes.

The motor stator 11 is forced into the cylindrical surface 24 of the member 10 by any standard press. The stator 11 preferably is formed with an external cylindrical surface 31 and an internal cylindrical surface 32, these surfaces being rendered substantially coaxial during the manufacture of the stator so that when a stator is forced into the surface 29, the internal cylindrical surface 32 of the stator will be substantially coaxial with the common axis of the member 10 within tolerances required for proper cooperation with the motor rotor.

Figure 7:
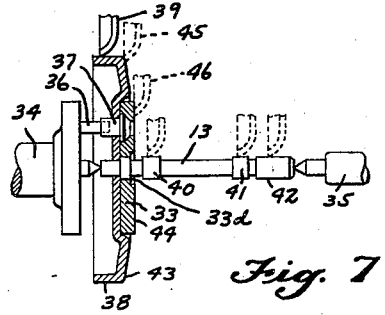

The sealing member 12 preferably is made of deep drawing steel and is stamped roughly to the shape shown in Fig. 7. This member has welded thereto a stamped plate 33 and a stationary shaft 13, the plate 33 and the shaft 13 being welded so that they are substantially integral with the sealing member 12. The plate 33 has an annular groove 33a adjacent the shaft 13 for the reception of a thrust washer 33b hereafter to be more fully described. After the welding operation, the sealing member is centered on the members 34 and 35 of a cylindrical grinding machine and fixed to be rotated by pin 36 on the machine-tool member 34 which cooperates with the recess 37 to be more fully hereafter described. By cylindrical grinding operations, an external cylindrical telescoping surface is produced by the cylindrical grinding tool 39 which also produces one or more external cylindrical bearing surfaces 40 and 41 and the grinding surface 42 on the shaft 13. The cylindrical surfaces 38, 40, 41 and 42 are truly coaxial since they are produced by external cylindrical grinding members about a common axis without disturbing the set-up. In addition, the plane abutting surface 43 and the plane compressor receiving surface 44 are produced by face grinding operations indicated at 45 and 46. Since these are also produced on the same set-up, they are truly at right angles to the common axis of the sealing member.

Figure 8:
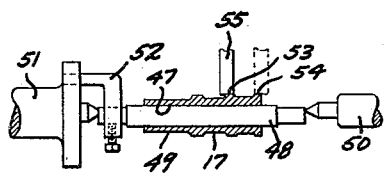
Figure 9:
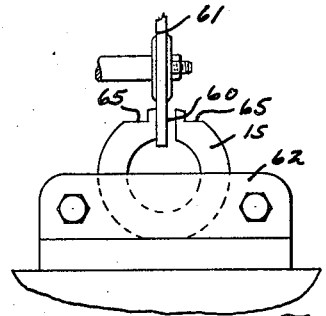
Figure 10:
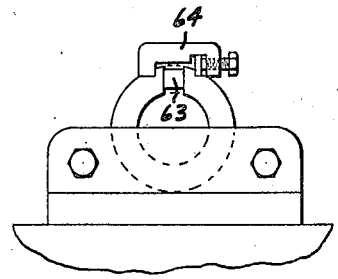

The drive shaft 17 is also finished by grinding operations diagrammatically shown in Fig. 8. The rough blank of the drive shaft is formed with an internal cylindrical bearing surface 47 preferably by a reaming operation (not shown) and thereafter is mounted on a mandrel 48 which cooperates with the internal cylindrical bearing surface. The drive shaft fits snugly on the mandrel. The motor rotor receiving surface 49 is roughly straight knurled in any suitable manner, or may be made tapered in order to effect a driving fit between the motor rotor 14 and the surface 49. The surface 49 need not be finished to relatively close limits since ultimately it is necessary only to maintain the rotor-stator gap. The mandrel 48 is eccentrically mounted on the centers 50 and 51 and is driven by the dog 52 and by the chuck at 51. External eccentric cylindrical surfaces 53 and 54 are ground on the drive shaft by means of external cylindrical grinding member 55. The motor rotor 15 is produced with an internal cylindrical surface 56 and an external cylindrical surface 57, so that the same may be forced on the drive shaft by any standard press operation and so that the external cylindrical surface 57 is substantially coaxial with the internal cylindrical surface 47 within the tolerance required for proper cooperation with the motor stator 11. However, if the surface 49 has been made tapered or conical, the internal surface 56 of the rotor is also made conical to cooperate therewith. It is to be understood, however, that the motor stator 14 may be assembled on the drive shaft and its external surface 57 may be ground by placing the mandrel on the center position in a lathe, so that the surface 57 may be made truly coaxial with the internal surface 47.

The compressor is preferably formed of a stationary pumping cylinder 15 and a rotary piston 16. The pumping cylinder 15 preferably is formed as shown in Figs. 9 to 12 inclusive. The rough blank, which may be a roughly formed annulus, has a slot 60 formed therein and finished to accurate dimension by the face grinding tool 61 while held in the vise or fixture 62. Preferably the slot 60 is formed parallel with the radius of the annulus. The notches 65 are also cut adjacent the slot 60. Thereafter a motor spacing block 63, which has been made very carefully to size, is placed in the slot 60 and a clamp 64 is placed in the notches 65. The clamp 64 brings the two sides of the slot 60 closely against the block 63 and spaces them exactly for the reception of the divider 66 hereafter to be more fully described. After the block 63 is firmly in place, the annulus is placed in a chuck 67 which is held on the rotary spindle 68. While in this position, an internal cylindrical surface 69 is formed by an internal rotary grinding tool 70, and one end plane surface 71 is face cut by the radial grinding tool 72. Since these two surfaces are ground while the annulus is in the chuck 67, the surfaces 69 and 71 are truly at right angles to each other. The annulus is then placed on a magnetic chuck 73 and the other end plane surface 74 is produced by the surface grinding tool 75. This is a standard grinding machine which insures a truly parallel relationship between the surfaces 71 and 74 and therefore insures that the surface 74 is also at right angles with surface 69. The clamp 64 and the block 63 remain on the annulus for a further assembling step hereafter to be more fully described.

Figure 12:
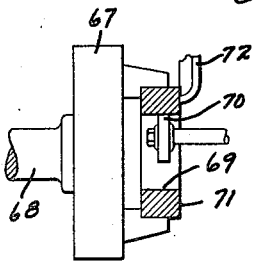
Figure 13:
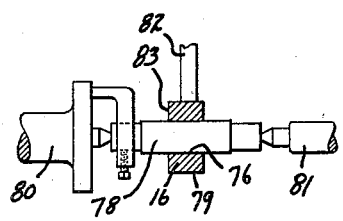
Figure 11:
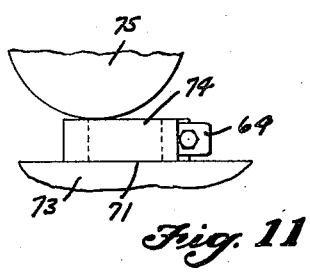

The rotary cylinder 16 is formed into a true annulus with end plane faces at right angles to its common axis by an operation similar to those shown in Figs. 12, 13 and 11. Thus the rough annulus is placed in a chuck similar to the chuck 67, but of smaller size to accommodate the piston 16 and an internal cylindrical surface 76 is cut by an internal grinding operation similar to that produced by the tool 70 on the surface 69. Also one end plane surface 77 is cut by a face grinding tool similar to the tool 72, producing the surface 77 truly at right angles, internal cylindrical surface 76. Thereafter the annulus is assembled tightly on the mandrel 78 and an external cylindrical surface 79 is ground by placing the mandrel 78 on the center members 80 and 81 and by producing a cylindrical grinding action by the tool 82. This operation insures that the surfaces 76 and 79 are truly coaxial. Thereafter the annulus 16 is placed on the magnetic chuck similar to the chuck 73 with the surface 77 adjacent the chuck and the end plane surface 83 is ground by surface grinding tool similar to the tool 75 to insure that the plane surfaces 77 and 83 are truly parallel with each other and at right angles to the axis of the piston 16.

Proper bolt holes, threaded and plain, are produced on the parts wherever necessary. The bolts need not have a tight fit on the plain holes, because the parts are held in place by the longitudinal clamping action of the bolts.

The foregoing operations described with respect to Figs. 6 to 13 inclusive, may be produced on standard tools, utilizing carefully made mandrels or blanks, and as will be understood by one skilled in the art, such procedure may be made to insure coaxiality and perpendicularity within any reasonable tolerance desired, so that the parts so produced will have cylindrical surfaces coaxial with each other, or eccentric with each other to any degree of eccentricity desired and with plane surfaces at right angles to the cylindrical surfaces within any degree of perpendicularity desired. While these parts may be made on standard machine-shop tools, it is to be understood that special tools may be used to produce the parts, if so desired.

A thrust bearing is provided to support the weight of the drive shaft 17 and the rotor 14. This may be provided by forming an annular channel in the plate 33 adjacent the shaft 13 for the reception of a hard steel split ring 33b which extends slightly above the surface of the plate 33. Preferably the shaft 13 has a cavity 128 of smaller diameter than its bearing surface adjacent the groove for the ring 33b. This permits the grinding tools to finish the surfaces on the plate 33 and the shaft 13 without necessity of care at the intersecting corner of the surfaces.

The parts above described are assembled on the sealing member 11 as follows. A guiding mandrel 85, (Fig. 5) which has been very carefully made with internal and external cylindrical surfaces properly coaxial and of the proper diameters, and with a bottom plane surface at true right angles to its cylindrical surfaces, is placed over the stationary shaft 13. The internal cylindrical surface of the mandrel 85 fits closely on the bearing surface 40 of the shaft and is of such a size that it is a proper guide for the stationary pumping cylinder 15. The pumping cylinder 15 with the block 63 and clamp 64 still in place is telescoped over the mandrel 85 and is securely fastened to the plate 33 by means of the bolts 86. These bolts are of sufficient power, so that when the clamp 64 is released, they firmly hold the stationary cylinder 15 with exactly the same spacing in the slot 60 which prevailed when the clamp was in place. Thereafter the mandrel 85 is manually removed by means of the knurled surface 87 which extends above cylinder 15 when the cylinder is in place. The rotary piston 16 is placed within the stationary cylinder 15 and the top cover plate 88 of the compressor is clamped to the cylinder 15 by means of screws 89. The top plate 88 is formed with the bottom surface 90 as a true plane surface and the cylinder 15 and piston 16 are made substantially of the same length but with the cylinder 15 just slightly longer (about .0004 inch extra length in a small household model), so that when the plate 90 is in place, the end surfaces 77 and 83 will have a sealing relation with respect to the surfaces 44 and 90 because of the oil film produced as hereinafter more fully described. After the plate 88 is in place, the oil cup member 91 is secured by means of screws 92 to the plate 88 with the gasket 91a between. The split thrust washer 33b which has a radially disposed oil passage 33c is then placed in the groove 33a with the upper surface above plate 33. The drive shaft 17, with its assembled motor rotor 14 is telescoped over the stationary shaft 13 into the piston 16, to rest on the thrust washer 33b, the piston 16 being moved to the proper position to receive the eccentric surfaces 53 and 54 of the shaft 17. Thereafter the cup member 10 and the sealing member 12 are assembled by telescoping the cylindrical surfaces 26 and 38, by abutting the plane surfaces 29 and 43 and by telescoping the end 93 of the shaft 13 in the cylindrical surface 27 of the member 10. When these members have been driven in place, the end 94 of the cup member is curled around the flange 95 of the sealing member 12 and is soldered or brazed as shown at 96.

Other features may be embodied in the motor-compressor unit to enhance its efficiency without impairing the ease of manufacture. Thus the stationary shaft 13 may be made hollow and may extend through the sealing member 12. This hollow shaft may have a radial opening 100 to receive the compressed refrigerant which then flows through the longitudinal passage 101 of the shaft 13 and is discharged into the pipe 102 connected to the end of the shaft 13. From thence the refrigerant flows to the condenser 103, and, in a liquefied form, flows through the pipe 104 to the heat interchanger 105 and from thence to the expander 106, then through the evaporator 107 and through the interchanger 105 and pipe 108 to the inlet fixture 37. The inlet fixture 37 may be in the form of a nipple which passes through the sealing member 12 and is held in place by the plate 33 when it is welded. The nipple may also include a screen 109, the plate 33 being provided with a passage 110 leading to the space between the cylinder 15 and the rotary piston 16.

The cylinder 15 is provided with a divider or follower 66 of substantially the same length as the piston 16. This divider is provided with one or more cylindrical pins 111 around which are placed springs 112 which bear radially outwardly against the inverted oil cup portion 113 of the oil cup member 91. If desired, the divider is provided with a half moon member 114 to increase the sealing surface adjacent to the rotary piston 16 as shown in Fig. 2, or the end may be made flat, being tangential to the piston, as shown in Fig. 14.

Oil is placed in the unit to the level 115, and, since the oil is under compression pressure, and leaks slowly along the follower 66, the oil will be forced up into the inverted cup-shaped member 113 and thus lubricate the entire vertical extent of the spacer or follower 66.

Lubrication for the internal portion of the compressor and for the bearing or bearings on the stationary shaft 13 are provided. For this purpose the oil cup member 91 is provided with an upper oil cup 120. A gasket 91a is interposed between the member 120 and the plate 88, so that the space inside of the cup 120 is substantially oil tight. The plate 88 is provided with a discharge opening 122 and with a valve 123 which seats on the annular valve seat 124. The compressed refrigerant, together with the oil which is forced past the divider 66 is discharged up through the passageway 122 and past the valve 123, comprising a metal reed secured by the screws 123a to the plate 88, into the cup compartment 120. This tends to fill the compartment with a substantial quantity of oil which thus submerges the opening 125 in the plate 88 in oil. A certain part of the oil from the compartment 120 forms a secondary lubricating cycle by flowing radially outward between the piston 16 and the plates 88 and 33 to be again discharged through the discharge opening 122 into the compartment 120. Another part of the oil from compartment 120 is forced upwardly between the stationary shaft 13 and the drive shaft 17 to lubricate their cooperating bearing surfaces. To this end, the oil flows down between the eccentric surfaces 53 and 54 and the internal cylindrical surface 76 of the piston 16, providing proper lubrication at this point, and is given a force-feed action by the groove 126 cut in the eccentric surfaces 53 and 54. This forces the oil down to the bottom of the drive shaft, where a portion flows outwardly between the piston 16 and the plate 33, while another portion lubricates the lower end of the drive shaft 17 and flows through the passage 33a in the thrust washer 33b radially inwardly into the space between the drive shaft 17 and the stationary shaft 13. The oil then fills the cavity 128 and is forced up through the spiral groove 129 in a force-feed manner by the rotation of the shaft, so that the oil flows through the cavity 130 to the upper bearing surface 131 between the stationary shaft and the drive shaft. Some of the oil passing through this latter bearing is discharged radially along the rotor and flows back to the oil space in the bottom of the compressor unit. The refrigerant discharged into the cup member 120 flows through the annular opening 132 and thence through openings 133 in the rotor 14 to the space above the rotor, so that the gas and oil are given separating action while flowing through the openings 133. The gas passes to the openings 100 and the oil flows radially outward and back through the rotor stator space by gravity to the bottom of the compressor unit. Suitable electrical lead-ins 134 are provided in the sealing member 12, for connecting the stator with the source of power. A suitable plug 135 is provided for filling or draining the unit.

If desired the outside of the casing may be provided with fins 136 brazed or soldered to the casing to radiate a portion of the heat of the unit. These fins may be formed of a single piece of metal bent in a zig-zag manner as shown in Fig. 4.

The outer surfaces of the shaft and the upper surface of the plate 10 may be given a hard finish preferably by a chrome plate finish. This finish may be applied electro-chemically. To this end the grinding operations on the steel may be carried out by giving allowance for subsequent plating, after which careful chrome plating may be performed with subsequent burnishing of the finish.

The motor rotor may be provided with counterbalance 170 and 171. The combined moments of the counter-balance 171 and of the rotary parts of the compressor are made equal to the moment of the counter-balance 170, thus providing a dynamic balance in the unit.

The length of the surface 26 and of the flange 38 are such that the curled portion 172 may be ground off and the unit disassembled three or more times. When the unit is reassembled, the length of the flange 38 is reduced sufficiently to permit another portion of the surface 26 to be curled around the end.

Preferably adjacent parts of the unit which bear against each other are made of different hardness. Thus the plate 33 and the shaft 13 are made of soft steel with their bearing surfaces chromium plated as described above. The rotary piston 16 is made of soft steel and is glass hardened. The shaft 17 is soft steel, hardened slightly less than the piston 16, but the outside surface may alternately be chromium plated. The cylinder 15 is soft steel, heat treated by alternate heating and cooling, to relieve internal stresses. The follower 66 is made of soft steel, glass hardened slightly less than piston 16. The cover plate is made of soft steel, heat treated similarly to cylinder 15. The cup member 10 and the sealing member 12 are made of a stamp stock, preferably of soft drawing steel.

This motor-compressor unit is particularly adapted for use in refrigerating where the compressor unit operates continuously as described in my copending application Serial No. 599,239. It is also particularly adapted for use with a refrigerant and lubricant which are completely miscible in each other whether the compressor operates continuously or not. It also may be used for intermittent operation or with refrigerants and lubricants which are not completely miscible in each other.

This motor-compressor unit is particularly adapted to be made without the use of cast metal.

While the form of embodiment of the invention as herein disclosed, constitutes a preferred form, it is to be understood that other forms might be adopted, all coming within the scope of the claims which follow.

What is claimed is as follows:

1. The method which comprises welding the end wall of a compressor cylinder to a support, soft annealing the end wall after the welding operation, machining the end wall surface, plating the surface with a relatively hard material, clamping a block in the slot of a slotted rotary compressor cylinder, positioning the cylinder on said end wall, securing the cylinder in place on the end wall and thereafter removing the block.

2. The method of assembling a slotted rotary compressor cylinder, an end wall for said cylinder and a slidable divider block which comprises, placing a temporary spacing block in the slot, clamping the temporary spacing block in place so as to maintain the dimensions of the slot opening correct, positioning the cylinder on the end wall, fixedly securing the cylinder in place on the end wall while the temporary block is in place and then removing the block and replacing the temporary spacing block with a slidable divider block.

ANDREW A. KUCHER.